United States Patent
Burgess et al.

(10) Patent No.: US 7,637,010 B2
(45) Date of Patent: Dec. 29, 2009

(54) METHODS FOR MACHINING TURBINE ENGINE COMPONENTS

(75) Inventors: Greg M. Burgess, Maineville, OH (US); Donald D. Lowe, Bow, NH (US)

(73) Assignee: General Electric Company, Schenectady, NY (US)

( * ) Notice: Subject to any disclaimer, the term of this patent is extended or adjusted under 35 U.S.C. 154(b) by 763 days.

(21) Appl. No.: 11/292,245

(22) Filed: Dec. 1, 2005

(65) Prior Publication Data

US 2007/0124933 A1 Jun. 7, 2007

(51) Int. Cl.
*B23P 15/04* (2006.01)

(52) U.S. Cl. ............... 29/889.23; 416/179; 416/223 R; 416/234; 416/229 A; 416/193 R; 205/640; 205/654; 205/686; 29/558

(58) Field of Classification Search .................. 416/190, 416/193 A, 213 R, 229 R, 234, 248; 29/281.1, 29/889, 559, 889.7, 889.1, 889.2, 889.21, 29/558, 889.23
See application file for complete search history.

(56) References Cited

U.S. PATENT DOCUMENTS

| | | | | |
|---|---|---|---|---|
| 992,310 | A * | 5/1911 | May | .............. 206/270 |
| 2,633,776 | A * | 4/1953 | Schenk | ...................... 409/132 |
| 4,579,705 | A * | 4/1986 | Matsuoka et al. | ........... 264/655 |
| 5,378,091 | A | 1/1995 | Nakamura | |
| 6,077,002 | A * | 6/2000 | Lowe | ....................... 409/132 |
| 6,428,252 | B1 | 8/2002 | Oldani | |
| 6,485,236 | B1 * | 11/2002 | Engeli et al. | ................ 409/132 |
| 6,716,088 | B2 * | 4/2004 | Jinbu et al. | .................... 451/51 |
| 6,782,779 | B2 * | 8/2004 | Steagall et al. | ............... 82/1.11 |
| 6,869,259 | B2 * | 3/2005 | Lebkuechner | ............... 409/132 |
| 6,991,434 | B2 * | 1/2006 | Heinrich et al. | ......... 416/241 R |
| 7,040,845 | B2 * | 5/2006 | Matsumoto et al. | ......... 409/132 |
| 2003/0039547 | A1 * | 2/2003 | Bourgy et al. | .................. 416/1 |
| 2003/0202854 | A1 | 10/2003 | Lebkuechner | |

FOREIGN PATENT DOCUMENTS

EP 0992310 A2 4/2000

OTHER PUBLICATIONS

EP Search Report, App. No. EP 06 12 5210 (Nov. 27, 2007).

* cited by examiner

*Primary Examiner*—David P Bryant
*Assistant Examiner*—Bayan Salone
(74) *Attorney, Agent, or Firm*—William Scott Andes, Esq.; Armstrong Teasdale LLP

(57) ABSTRACT

A method for machining a blank includes machining a first pocket in the blank having a first sidewall, machining a second pocket in the blank, machining a groove within material located between the first and second pockets to expose a second sidewall opposite the first sidewall, machining the first and second sidewalls, and alternately repeating machining the grove and the sidewalls to step mill the groove deeper in the blank and form a third pocket along which the second sidewall extends.

12 Claims, 4 Drawing Sheets

METHODS FOR MACHINING TURBINE ENGINE COMPONENTS

BACKGROUND OF THE INVENTION

This invention relates generally to machining processes, and more specifically, for example, to methods for fabricating turbine engine components.

At least some known gas turbine engines include a fan assembly, a compressor, and/or turbines that include a rotor disk having a plurality of rotor blades, or airfoils, that extend radially outward therefrom. For example, at least some known rotor blades are coupled to the disk by a dovetail that is received within a corresponding dovetail slot formed in a supporting perimeter of the rotor disk. To facilitate enhanced performance, at least some engine manufacturers have attempted to increase the number of blades within each rotor assembly. However, as the number of rotor blades increases, the disk perimeter may not have sufficient material to support the increased number of blades within acceptable stress limits. Accordingly, at least some known fans, compressors, and/or turbines are fabricated with a rotor "blisk" wherein the rotor blades are formed integrally with the rotor disk in a one-piece assembly. The unitary assembly may reduce the centrifugal stresses induced to the rotor disk.

However, the manufacture of a rotor blisk may be more complex than the manufacture of individual rotor blades and discrete rotor disks. Moreover, because the rotor disk and rotor blades of the blisk are integrally formed, manufacturing defects may be more critical than those associated with individual rotor blades and discrete rotor disks. For example, if one or more of the rotor blades within a blisk is outside acceptable manufacturing tolerances, the entire blisk may be deemed defective and unusable. Accordingly, the manufacture of a blisk may require more diligence and/or compliance with manufacturing tolerances than the manufacture of individual rotor blades and/or discrete rotor disks. Accordingly, such enhanced compliance and/or diligence may increase time and costs associated with manufacturing an engine as compared to other engine assemblies.

At least one known method of manufacturing a blisk includes machining the blisk from a blank using a rotating mill and a step milling process. For example, using a bottom of the rotating mill, one or more grooves are rough-cut across the blank to partially create two opposite sidewalls that will eventually each form a side of adjacent finished rotor blades of the blisk. Portions of the sidewalls are then finish-cut using a side of the rotating mill. Each groove rough-cut and sidewall finished cuts are then alternately repeated to machine deeper into the blank to form a pocket within the blisk. By rough cutting the pocket depth in increments and alternatively finishing the sidewalls in turn, the step milling process forms a pocket having a convex side of one of the adjacent rotor blades and a concave side of the other adjacent rotor blade, both finished within accepted tolerances. The blank is then indexed and the step milling process is repeated to form the next pocket and finished sides along the perimeter of the blank.

To facilitate preventing excess wear of the mill, a different but generally similarly configured rotating mill is sometimes used to form different pockets of the blisk to avoid excess wear of each mill. However, forging stock material may need to by removed from portions of the finished rotor blades, such as leading and/or trailing edge portions, which may increase a cycle time, difficulty, and/or cost of fabricating the blisk. For example, removing the forging stock material may necessitate more steps, operators to perform the extra steps, tooling, and/or operator training to fabricate the finished rotor blades. Moreover, because opposite sides of each rotor blade are machined using different mills, manufacturing variances may occur between the opposite sides. Furthermore, because opposite sides of the same blade may be machined at different times, a change in thermal conditions may cause manufacturing variances between the opposite sides. Such manufacturing variances, for example variances in blade thickness, may affect a performance of the blades and/or a dynamic balance of the blisk.

BRIEF DESCRIPTION OF THE INVENTION

A method is provided for machining a blank. The method includes machining a first pocket in the blank to create a first sidewall, machining a second pocket in the blank, machining a groove between the first and second pockets to expose a portion of a second sidewall opposite the first sidewall, machining the first and second sidewalls, and alternately repeating machining the grove and the first and second sidewalls to step mill the groove deeper in the blank and form a third pocket that is at least partially defined by the second sidewall.

DETAILED DESCRIPTION OF THE INVENTION

As used herein the terms "machining," "machine," and "machined" may include any process used for shaping an object. For example, processes used for shaping an object may include, but are not limited to including, turning, planning, milling, grinding, finishing, polishing, and/or cutting. In addition, and for example, shaping processes may include, but are not limited to including, processes performed by a machine, a machine tool, and/or a human being. The above examples are intended as exemplary only, and thus are not intended to limit in any way the definition and/or meaning of the terms "machining," "machine," and "machined".

Figure 1:
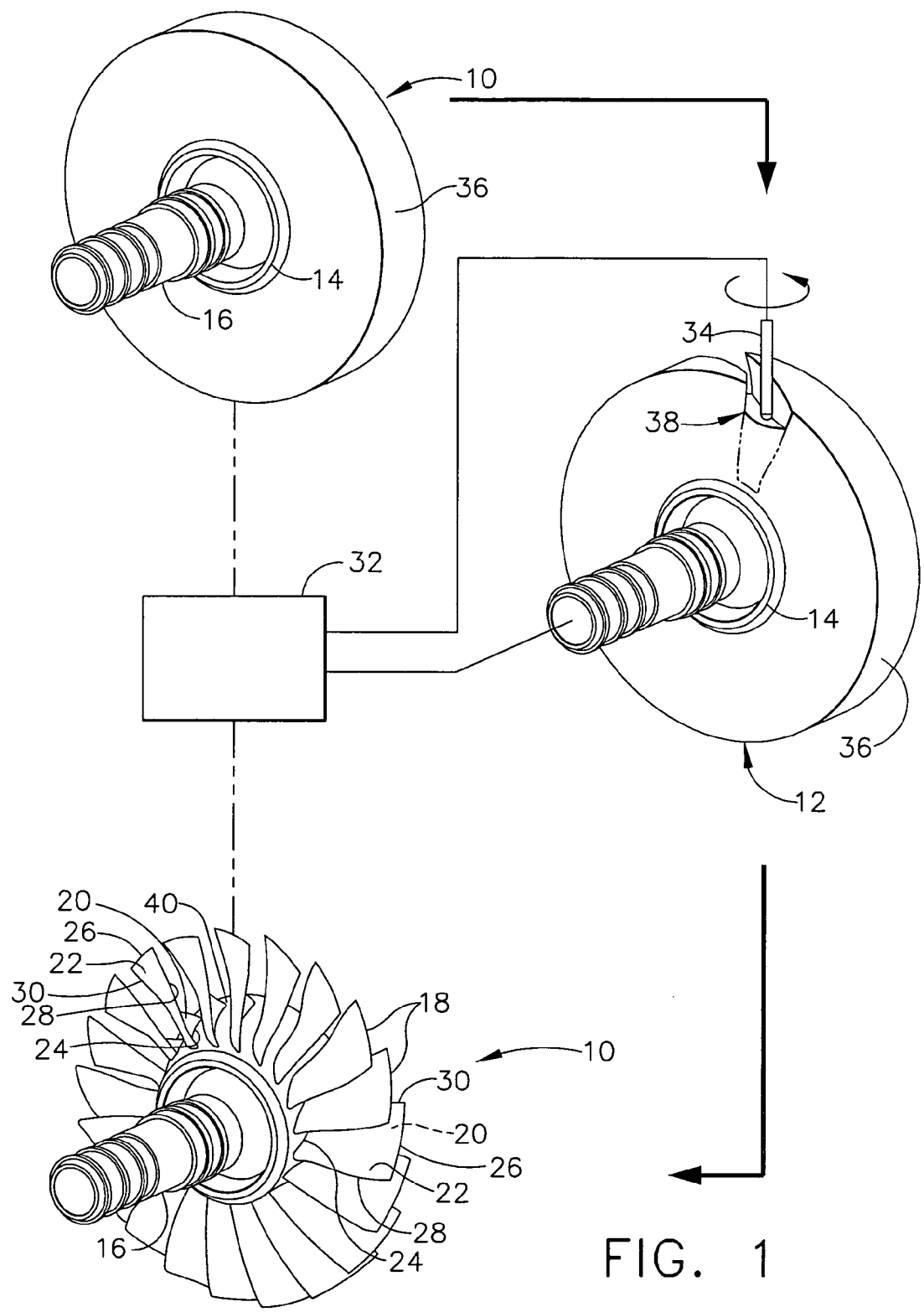
FIG. 1 is a schematic representation of an exemplary embodiment of a method of fabricating an exemplary gas turbine engine rotor blisk.

FIG. 1 is a schematic representation of an exemplary embodiment of a method of fabricating an exemplary gas turbine engine rotor blisk 10. A workpiece, or blank, 12 in the exemplary form of a solid annular disk having an annular central hub 14 from which extends a shaft 16. In the exemplary embodiment, blank 12 has a size and shape, and is formed from a material, configured for machining rotor blisk 10 therefrom. Blisk 10 includes a plurality of circumferentially spaced apart rotor blades 18 extending radially outwardly from hub 14, which integrally supports blades 18 thereon.

Each blade 18 has an exemplary known configuration including a generally concave pressure side 20 and a generally convex suction side 22. Each side 20 and 22 extends from a root 24 to a tip 26 of each blade 18. Each side 20 and 22 also extends between a leading edge 28 and trailing edge 30 of each blade 18. In the exemplary embodiment, each blade 18 has a suitable airfoil configuration which typically twists about a radial axis extending therethrough from blade root 24 to blade tip 26, with varying taper and/or change in chord length therebetween. In the exemplary embodiment, a camber of each blade 18 also typically varies from blade root 24 to blade tip 26, with the resulting airfoil having a 3-D contour which may require a suitably smooth surface finish over sides 20 and 22 thereof for maximizing aerodynamic efficiency.

Blank 12 is machined using a known machine 32, such as, but not limited to, a multi-axis milling machine having a rotating machine tool 34. Although any suitable machine tool may be used, in some embodiments tool 34 is a ball end mill. In the exemplary embodiment, blank 12 is coupled to machine 32, and with respect to tool 34, with a plurality of degrees, or axes, of movement for following 3-D machining paths through blank 12. Generally, blank 12 is machined radially inwardly from a perimeter 36 thereof down to hub 14 to define a pocket (not labeled with a reference numeral in FIG. 1) between each blade 18 having a radially inner platform 40. The general operation, configuration, arrangement, and/or structure of machine 32, machine tool 34, and blank 12 are known in the art and will therefore not be described in more detail herein.

Figure 2:
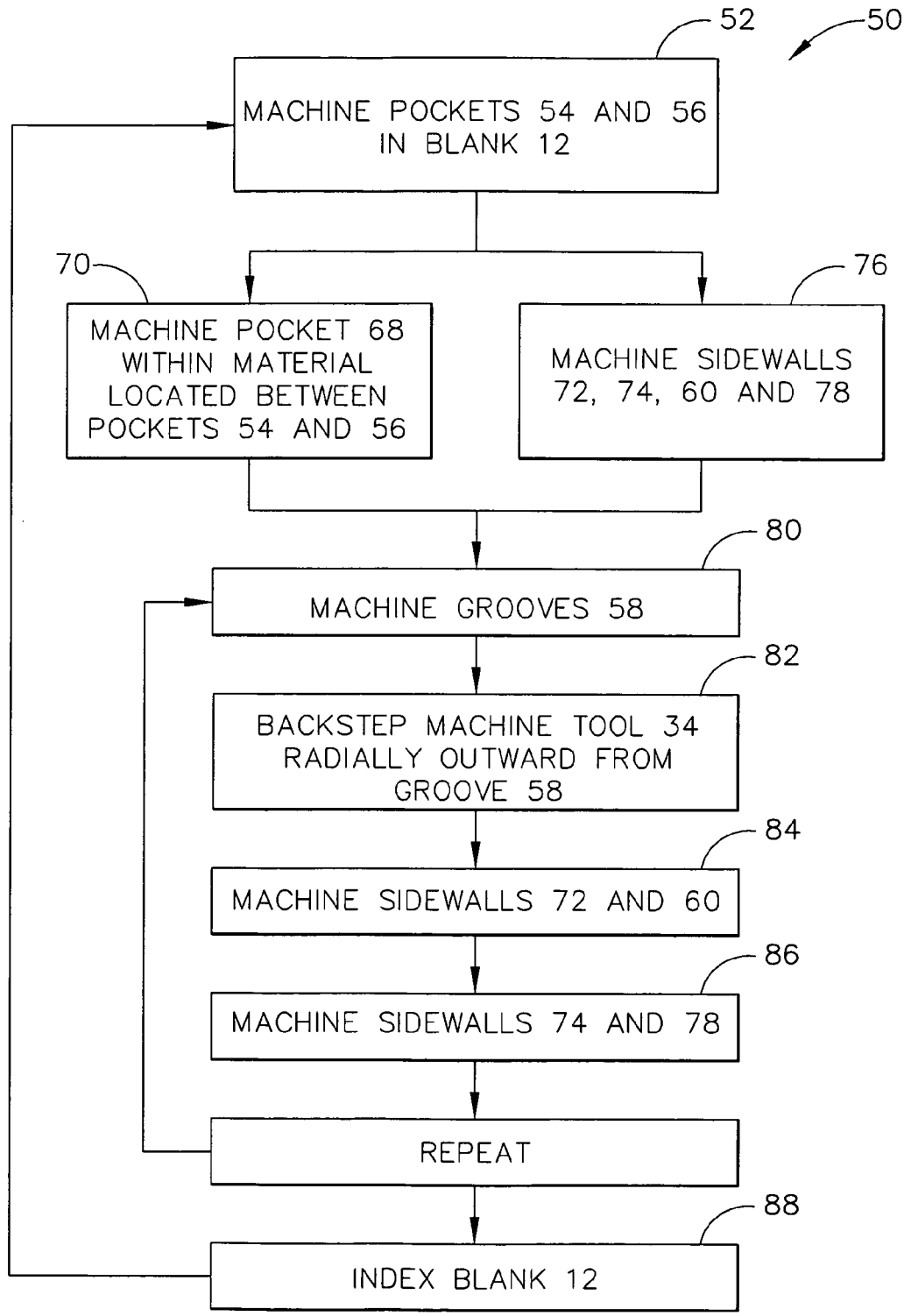
FIG. 2 is a flow chart illustrating an exemplary embodiment of a method for machining the blank shown in FIG. 1 to fabricate the gas turbine engine rotor blisk shown in FIG. 1.
Figure 3:
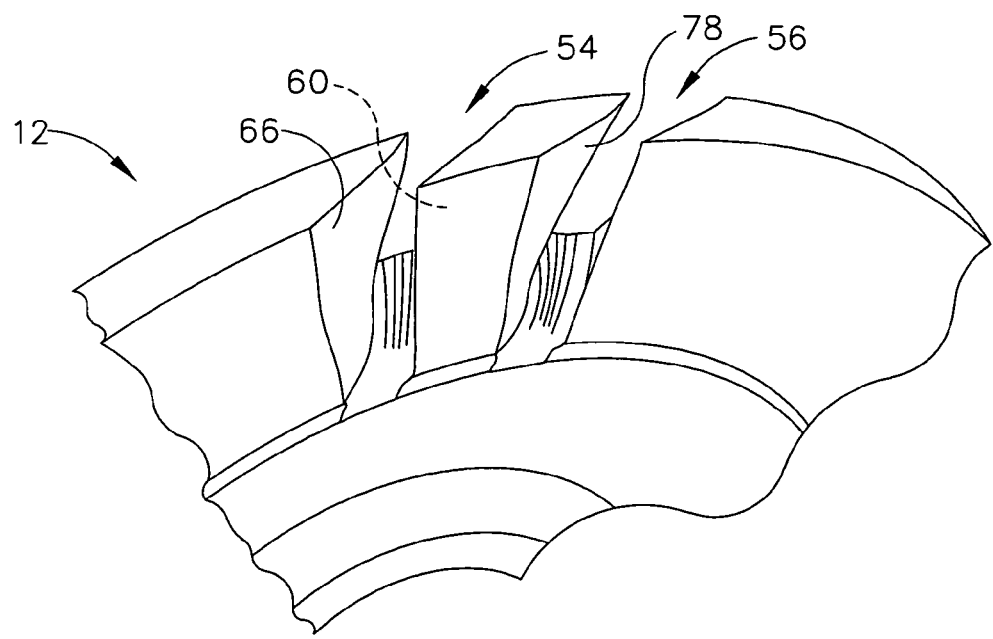
FIG. 3 is a perspective view of a portion of the blank shown in FIG. 1 illustrating a portion of the method shown in FIG. 2.
Figure 4:
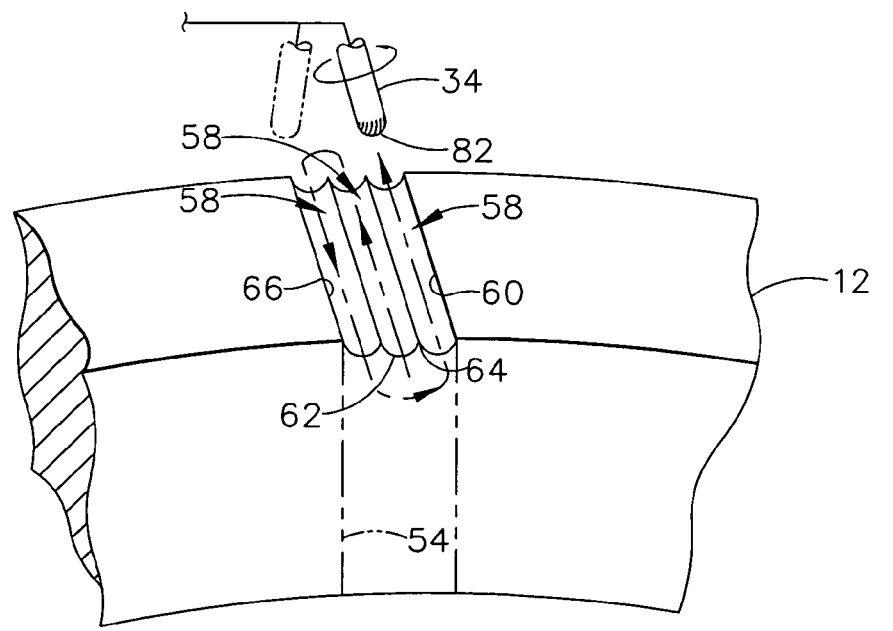
FIG. 4 is a perspective view of a portion of a perimeter of the blank shown in FIG. 1 illustrating an exemplary process for machining exemplary pockets therein.

FIG. 2 is a flow chart illustrating an exemplary embodiment of a method 50 for machining blank 12 (shown in FIG. 1) to fabricate rotor blisk 10 (shown in FIG. 1). FIG. 3 is a perspective view of a portion of blank 12. Method 50 includes machining 52 a plurality of pockets 54 and 56 in blank 12 to a rough tolerance, for example, but not limited to, a few mils. Pockets 52 and 54 may be formed using any suitable process. For example, and although other processes may be used, FIG. 4 is a perspective view of a portion blank 12 illustrating an exemplary process for machining pockets 54 or 56. In the exemplary embodiment, pockets 54 and 56 are machined, using machine tool 34 for example, by machining an elongate groove 58 transversely across blank 12 to partially expose a sidewall 60. Groove 58 has an arcuate bottom 62. Blank 12 is then machined as shown in FIG. 4 by machining transversely across blank 12 and along the previously machined groove 58 in one or more alternating passes to machine a plurality of grooves 58 adjoining each other at bottom cusps 64, and to expose another sidewall 66. By repeating such machining, grooves 58 are machined radially deeper into blank 12 to form a pocket 54 or 56 along which the sidewalls 60 and 66 extend. In some embodiments, grooves 58 and sidewalls 60 and 66 are machined using the same machining tool 34. For example, in some embodiments grooves 58 are machined with a bottom 82 of machine tool 34 and sidewalls 60 and 66 are machined with a side 83 of machine tool 34.

Figure 5:
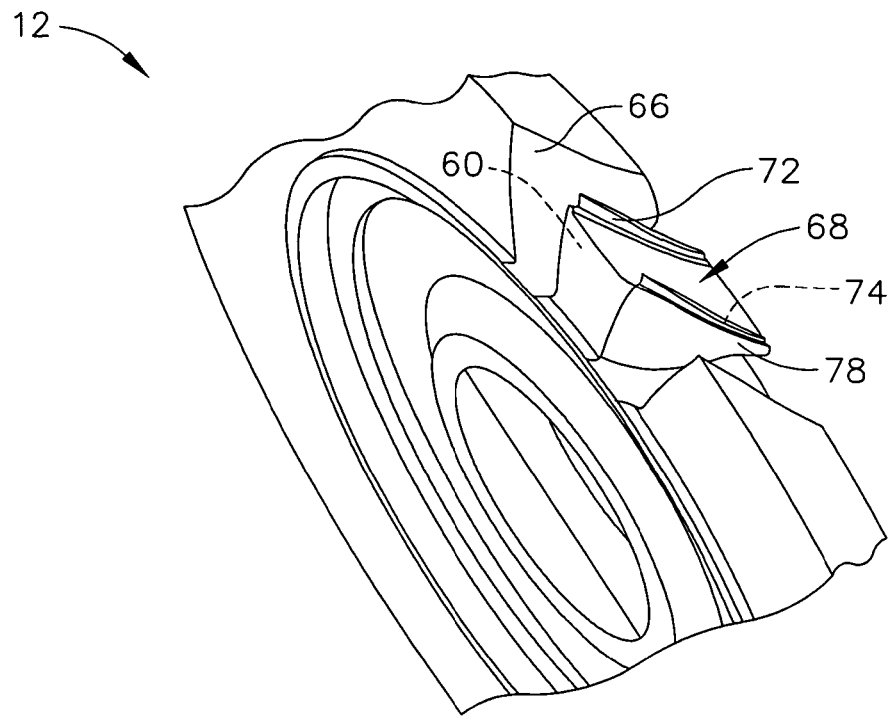
FIG. 5 is a perspective view of a portion of the blank shown in FIG. 1 illustrating a portion of the method shown in FIG. 2.

FIG. 5 is a perspective view of a portion blank 12 illustrating a pocket 68 machined within material located on blisk 12 between pockets 54 and 56. Method 50 includes machining 70 pocket 68, which includes a pair of sidewalls 72 and 74 extending along pocket 68 and facing each other. Method 50 also includes machining 76 sidewalls 72 and 74 of pocket 68, sidewall 60 of pocket 54, and a sidewall 78 of pocket 56 that is opposite sidewall 74 of pocket 68 to form pressure and suction sides 20 and 22 (shown in FIG. 1) of two adjacent rotor blades 18 (shown in FIG. 1). Blank 12 can then be indexed and method 50 repeated on other portions of blank perimeter 36 to fabricate rotor blisk 10.

In the exemplary embodiment, machining 70 pocket 68 and machining 76 sidewalls 72, 74, 60, and 78 includes machining 80 one or more adjacent grooves 58 axially across blank perimeter 36 to start the formation of pockets 68. In the exemplary embodiment, machine tool 34 is fed transversely across blank perimeter 36 in three exemplary passes to form a center groove, a left groove, and a right groove in turn. Machine tool 34 is then repeatedly fed across the blank in multiple transverse passes and multiple radial steps or levels. In the exemplary embodiment, the plurality of radial levels each has a radial depth of about one fifth the cutting depth of machine tool 34, which may be sufficient to initially form the radially outermost portion of sidewalls 72 and 74. Grooves 58 are machined to a rough tolerance, for example, but not limited to, a few mils.

After machining a plurality of levels, machine tool 34 is back stepped 82 radially outwardly from a respective one of grooves 58 adjacent either sidewall 72 or 74 prior to machining that sidewall. As such, a gap is provided between a bottom 82 of machine tool 34 and the underlying previously machined groove 58. Machine tool 34 is then fed along a perimeter 84 of sidewall 72 of pocket 68 and sidewall 60 of pocket 54 to machine 84 sidewalls 72 and 60 to finish tolerance for achieving a suitable finished surface of the blade 18. In some embodiments, the finish tolerance is less than the rough tolerance of grooves 58, as shown in FIG. 5. For example, the finish tolerance may be, but is not limited to, between about 0.5 and 1 mil. In the exemplary embodiment, the same machine tool 34 is used to machine sidewalls 60 and 72 and grooves 58. For example, in some embodiments grooves 58 are machined with machine tool bottom 82 and sidewalls 60 and 72 are machined with machine tool side 83. Once sidewalls 60 and 72 have been machined, sidewall 74 of pocket 68 and sidewall 78 of pocket 56 are machined 86 in a similar fashion to sidewalls 72 and 60.

Machine tool 34 is then alternately used to continue the step milling downwardly for machining groove 58 and sidewalls 72, 74, 60, and 78. As such, pocket 68 may be step milled in small depth increments corresponding with each of the plurality of levels and as many additional levels as required to reach the final depth of pocket 68 at blisk hub 14. Such partial depth milling allows very high rotary speeds of tool 34 and correspondingly high feed rates that may be greater than those possible in conventional milling where a ball end mill is typically plunged radially to its full-radius cutting depth for maximizing material removal along all available cutting surfaces of the mill.

Figure 6:
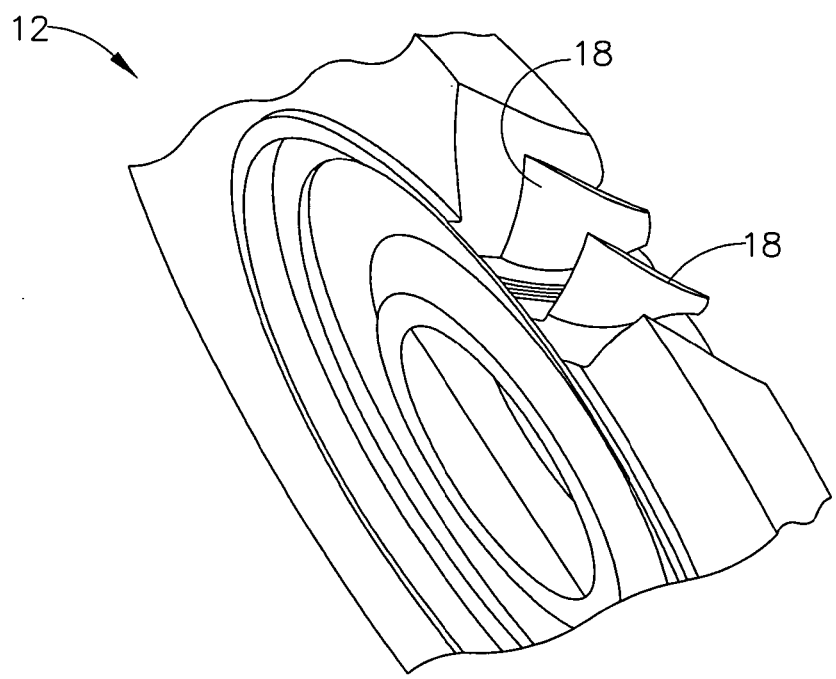
FIG. 6 is a perspective view of a portion of the blank shown in FIG. 1 illustrating a portion of the method shown in FIG. 2.

In accordance with the invention, as each new level of material is removed, a small amount of excess side material is left on each sidewall 72, 74, 60, and 78, and more specifically sides 20 and 22 of each blades 18 being fabricated. This process of stepping down pocket 68 while alternately roughing and finishing the bottom of pocket 68 and sidewalls 72, 74, 60, and 78 effects a more accurate airfoil shape since a blade 18 being fabricated is constantly supported by solid material directly below the area where the finish machining on sidewall 72, 74, 60, and 78 is being made. This stepping process proceeds until the entire pocket 68 is finished to hub 16 by rough machining the pocket depth in increments and alternately finish machining sidewalls 72, 74, 60, and 78 in turn. The resulting pocket 68 will have the convex suction side 22 of one blade 18 and the concave pressure side 20 of an adjacent blade 18, both to finished tolerance. FIG. 6 is a perspective view of a portion of blank 12 illustrating two adjacent finished blades 18 in the form of cantilevers extending radially outwardly from the blank hub 12. Blank 12 can then be indexed 88 to the next series of pockets and method 50 is repeated to fabricate rotor blisk 10.

Because it may be desired to have relatively small blending radii between roots 24 of blades 18 and hub 16, a subsequent machining operation may be effected using a smaller diameter ball end mill for blending roots 24 into hub 16.

Because the finish machining of sidewalls 72, 74, 60, and 78 is alternately effected after rough milling a corresponding underlying groove 58, the sidewalls are rigidly supported with little if any circumferential flexibility as found in the freestanding conventional process. As a result, the finish blades 18 may be made with suitably smaller manufacturing tolerances and with a more accurate nominal dimension, and with greater accuracy from blade-to-blade. This effectively eliminates the problem of blade-to-blade manufacturing variation found in the conventional process which could cause unacceptable unbalance of the machined blisk. Moreover, because opposite sides of each blade 18 are machined very close in time, the methods described and/or illustrated herein may facilitate reducing manufacturing variances caused by different thermal conditions.

As a result, the finished blisk 10 step milled includes a plurality of blades 18 extending radially outwardly from hub 12 with improved accuracy and finish as compared with a conventionally point milled blisk. The 3-D contour of individual blades 18 may be more precise from blade-to-blade and may have a distinctly different and substantially smoother surface contour achieved with a substantial reduction in the number of machining passes.

Although the methods described and/or illustrated herein are described and/or illustrated with respect to a gas turbine engine, and more specifically to fabricating a gas turbine engine blisk, practice of the methods described and/or illustrated herein is not limited to fabricating gas turbine engine blisks, nor gas turbine engines generally. Rather, the methods described and/or illustrated herein are applicable to machining any blank of material.

Exemplary embodiments of methods are described and/or illustrated herein in detail. The methods are not limited to the specific embodiments described herein, but rather, steps of each method may be utilized independently and separately from other steps described herein. Each method step can also be used in combination with other method steps.

When introducing elements/components/etc. of the methods described and/or illustrated herein, the articles "a", "an", "the" and "said" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc.

While the invention has been described in terms of various specific embodiments, those skilled in the art will recognize that the invention can be practiced with modification within the spirit and scope of the claims.

What is claimed is:

1. A method for machining turbine engine components from a blank, said method comprising:
    fixing the blank in a first position;
    machining, at the first position of the blank, a first pocket in the blank to create a first sidewall,
    a second pocket in the blank to create a second sidewall, and
    at least one groove between the first pocket and the second pocket to expose a portion of a third sidewall opposite the first sidewall and a portion of a fourth sidewall opposite the second sidewall;
    alternately repeating machining, at the first position of the blank, the at least one groove, the first sidewall, and the second sidewall to step mill the at least one groove deeper in the blank and form a third pocket that is at least partially defined by the third sidewall and the fourth sidewall such that the first sidewall and the third sidewall define a first blade and such that the second sidewall and the fourth sidewall define a second blade adjacent the first blade; and
    indexing the blank to a second position after the first blade and the second blade are formed.

2. A method in accordance with claim 1 wherein alternately repeating machining, at the first position of the blank, the at least one groove, the first sidewall, and the second sidewall comprises machining the first sidewall and the third sidewall by machining along a perimeter of the first blade in a direction that is substantially perpendicular to a radial axis of the first blade.

3. A method in accordance with claim 2 wherein alternately repeating machining, at the first position of the blank, the at least one groove, the first sidewall, and the second sidewall comprises machining the second sidewall and the fourth sidewall by machining along a perimeter of the second blade in a direction that is substantially perpendicular to a radial axis of the second blade.

4. A method in accordance with claim 1 wherein alternately repeating machining, at the first position of the blank, the at least one groove, the first sidewall, and the second sidewall comprises machining the first sidewall, the second sidewall, the third sidewall, and the fourth sidewall in one operation.

5. A method in accordance with claim 1 wherein alternately repeating machining, at the first position of the blank, the at least one groove, the first sidewall, and the second sidewall comprises machining at least one of the first sidewall, the second sidewall, the third sidewall, and the fourth sidewall to a rough tolerance and subsequently machining the at least one of the first sidewall, the second sidewall, the third sidewall, and the fourth sidewall to a finish tolerance that is less than the rough tolerance.

6. A method in accordance with claim 1 wherein alternately repeating machining, at the first position of the blank, the at least one groove, the first sidewall, and the second sidewall comprises machining the at least one groove, the first sidewall, the second sidewall, the third sidewall, and the fourth sidewall using the same machining tool.

7. A method in accordance with claim 1 wherein machining at least one groove between the first pocket and the second pocket comprises machining the third sidewall and the fourth sidewall in a plurality of sub-steps spaced above a bottom of the at least one groove.

8. A method in accordance with claim 1 wherein machining at least one groove between the first pocket and the second pocket comprises machining a plurality of adjacent grooves between the first pocket and the second pocket.

9. A method in accordance with claim 1 wherein alternately repeating machining, at the position of the blank, the at least one groove, the first sidewall, and the second sidewall comprises alternately repeating machining the at least one groove, the first sidewall, the second sidewall, the third sidewall, and the fourth sidewall.

10. A method in accordance with claim 1 wherein alternately repeating machining, at the first position of the blank, the at least one groove, the first sidewall, and the second sidewall comprises machining the first blade and the second blade to be rotor blades, each of the first blade and the second blade having at least one of a twist and a taper between a root and a tip.

11. A method in accordance with claim 1 wherein indexing the blank to a second position after the first blade and the second blade are formed comprises indexing the blank through a sequence of positions, wherein a pair of adjacent blades is step milled and finished at each position of the sequence of positions before the blank is indexed to another position of the sequence of positions.

12. A method in accordance with claim 1 wherein alternately repeating machining, at the first position of the blank, the at least one groove, the first sidewall, and the second sidewall comprises machining at least one of the at least one groove, the first sidewall, the second sidewall, the third sidewall, and the fourth sidewall using a rotating mill.

* * * * *

UNITED STATES PATENT AND TRADEMARK OFFICE
CERTIFICATE OF CORRECTION

PATENT NO. : 7,637,010 B2  Page 1 of 1
APPLICATION NO. : 11/292245
DATED : December 29, 2009
INVENTOR(S) : Burgess et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1062 days.

Signed and Sealed this

Ninth Day of November, 2010

David J. Kappos
*Director of the United States Patent and Trademark Office*